May 31, 1927.
K. KRAUSS
1,630,390
ALTERNATING CURRENT MOTOR
Filed May 28, 1925
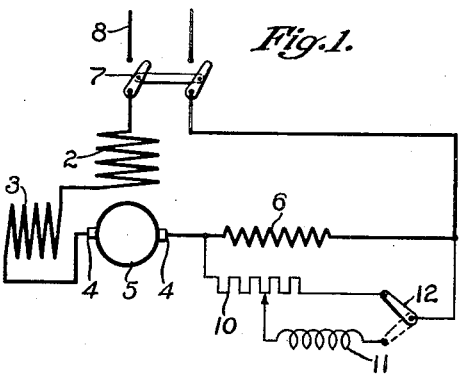
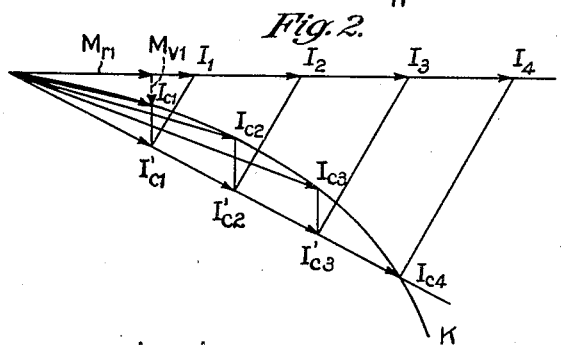
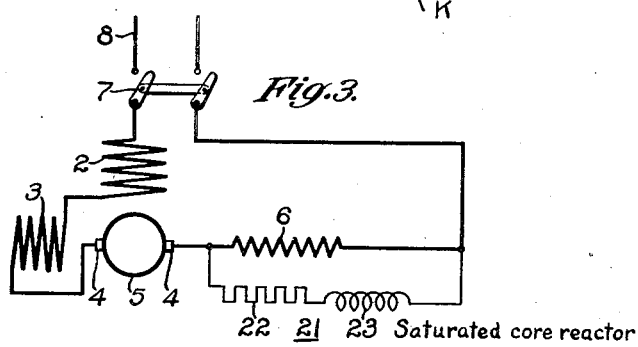
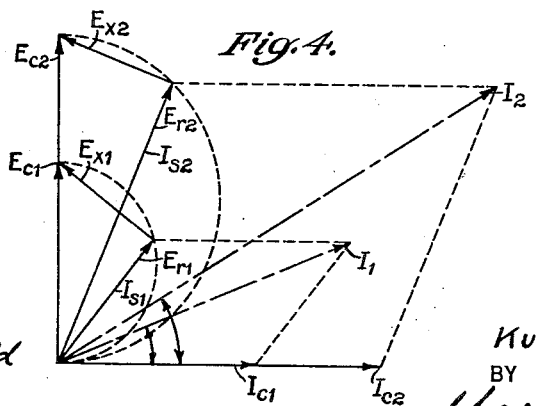
WITNESSES:
R. J. Fitzgerald
S. M. Pineles
INVENTOR
Kurt Krauss.
BY
Wesley G. Carr
ATTORNEY Patented May 31, 1927.

1,630,390

UNITED STATES PATENT OFFICE.

KURT KRAUSS, OF BERLIN-FRIEDENAU, GERMANY, ASSIGNOR TO WESTINGHOUSE ELECTRIC & MANUFACTURING COMPANY, A CORPORATION OF PENNSYLVANIA.

ALTERNATING-CURRENT MOTOR.

Application filed May 28, 1925, Serial No. 33,231, and in Germany May 28, 1924.

My invention relates to alternating-current motors of the commutator type and it has particular relation to series motors employing a commutating-pole winding.

The problem of commutating the armature current, serious as it may be in the case of a direct-current machine, is of much more importance and is much more difficult in the case of alternating-current machines and presents particularly serious conditions in large single-phase motors such as are employed in railway service.

To overcome the commutating difficulties in such motors, a commutating-pole winding is usually provided, producing a flux which traverses the coils operating in the commutating zone to induce an electromotive force that will neutralize the forces which oppose the commutation. To produce a flux giving the correct commutating conditions, the current in the commutating-pole winding must have a predetermined phase relation to the armature current. In particular, when the commutating-pole winding is connected in series with the field winding and with the armature, the current in the commutating-pole winding must increase in phase displacement, as well as in magnitude, with an increase of the armature current.

Heretofore, as far as I am aware, it has been customary to adjust the phase relation of the currents in the commutating pole winding so as to give the desired commutating flux conditions for a particular operating speed, and it has been customary to sacrifice, to a certain extent, the quality of the commutation at other speeds.

However, with the increasing size of the motors manufactured for modern railway operation, the commutating conditions are so difficult that it becomes of more and more importance to provide a simple and reliable method of securing the exact required commutating-pole flux for each operating speed.

One object of my invention is to provide an alternating-current series motor having a commutating-pole winding which is automatically excited by a current of such phase and magnitude as to produce the optimum commutating conditions throughout substantially the entire range of operation.

Another object of my invention is to provide a series commutator motor having a serially connected commutating-pole winding and an impedance device in shunt to said commutating-pole winding, the relative values of the reactance and the resistance of said impedance device being so proportioned as to produce an increasing phase displacement between the current of the commutating winding and the current in the armature circuit in response to an increase in said latter current.

Another object of my invention is to provide an impedance device adapted to be connected in an alternating-current circuit, said impedance device comprising a reactor and a shunt connected in parallel to said reactor and so proportioned that the magnitude and phase relation of the currents in the reactor vary, in a predetermined manner, in response to variations of the current in said circuit.

The main features of my invention, which I believe to be patentable, are definitely indicated and pointed out in the claims appended hereto. For a better understanding of my invention, reference may be had to the following specification, taken in connection with the accompanying drawing, in which—

Fig. 1 is a diagrammatic view of a single-phase commutator motor having a commutating-pole winding which is designed to produce correct commutating conditions only at a predetermined point of operation, Fig. 2 is a vector diagram of current relations in the commutating-pole windings, Fig. 3 is a view similar to Fig. 1 illustrating a single-phase series motor embodying my invention, and Fig. 4 is a vector diagram illustrating the current relations in the commutating-pole winding obtaining in the improved motor shown in Fig. 3.

The motor shown in Fig. 1 embodies the essential parts utilized in a modern large-power single-phase series commutator motor. The motor has an exciting winding 2 and a compensating winding 3 connected, through brushes 4, in series with an armature 5 and a commutating-pole winding 6. The motor may be energized by means of a switch 7 which connects one terminal of the exciting winding 2 and one terminal of the commutating-pole winding 6 to an alternating-current line 8.

There are several features which influence the commutation in single-phase commutating machines such as the one shown in Fig. 1. Assuming that the compensating winding 3 fully neutralizes the effect of the current in the armature 5, the coils in which commutation takes place, and which are short-circuited by the brushes, are subject to three induced electromotive forces.

One electromotive force is induced in the short-circuited coils by reason of the reactance of the coils opposing the reversal of the current as it passes under the brush, and may be regarded as being in phase with, and proportional to, the armature current and also proportional to the speed of rotation, or the speed at which the reversals take place.

A second electromotive force is induced in the short-circuited armature coils by the transformer action of the exciting field induced by the exciting winding 2, and may be regarded as being proportional to the armature current and lagging 90 degrees behind the same.

To secure good commutation, the commutating pole flux must induce, in the rotating coil that is undergoing commutation, a third electromotive force that is equal and opposite to the resultant of the commutation reactance electromotive force and the transformer electromotive force mentioned above. Accordingly, the exciting current of the commutating-pole winding must be of such magnitude and phase relation as to produce a magneto-motive force that has first, an in-phase component which is proportional to the armature current to neutralize the reactance electromotive force, and second a component, in quadrature thereto, to neutralize the transformer electromotive force.

Since the voltage induced by the commutating-pole flux increases directly with the speed, the first component of the commutating-pole magneto-motive force must be directly proportional to the armature current and independent of the speed, while the second component, which neutralizes the transformer electromotive force that is independent of the speed, must vary inversely with the speed.

The different relations of the current components required to produce good commutation are shown in Fig. 2 wherein vectors $I_1$, $I_2$, $I_3$ and $I_4$ illustrate the armature currents and vectors $I_{c1}$, $I_{c2}$, $I_{c3}$ and $I_{c4}$ illustrate the corresponding commutating-pole currents required to produce ideal commutating conditions. The commutating-pole magneto-motive force, which may be represented by the commutating pole current $I_{c1}$, is shown to be a resultant of a component $M_{r1}$ which is in phase with the armature current and a component $M_{v1}$ which induces the field required for generating the electromotive force opposed to the transformer electromotive force.

In order to secure the proper phase relation and magnitude of the currents in the commutating-pole winding, it has been suggested to connect a resistor 10 in parallel with the commutating-pole winding and to control the phase of the current in the commutating pole winding by selecting the magnitude of the resistance.

However, as shown in Fig. 2, with a constant resistance, perfect commutating conditions can be obtained only for one particular operating condition since the phase angle between the current component in the commutating-pole winding and the current in the armature remains constant with a particular setting of the shunting resistor. This arrangement is accordingly effective only for one predetermined speed and a predetermined current, whereas, in order to secure ideal commutating conditions the phase angle between the main current and the commutating-pole current should increase with an increase in the armature current, as shown by the vectors $I_{c1}$, $I_{c2}$, $I_{c3}$ and $I_{c4}$, terminating in the curve K in Fig. 2.

If the shunting resistor is so chosen, for instance, as to give correct commutating conditions when the armature current has a value $I_4$, the actual commutating pole currents $I'_{c1}$, $I'_{c2}$, $I'_{c3}$, etc., corresponding to other operating points, differ in magnitude and phase from the ideal currents $I_{c1}$, $I_{c2}$, $I_{c3}$, etc.

It has also been suggested to connect a portion of the resistor which is used for one speed, in series with a choke coil 11, which may be connected in parallel to the commutating pole winding as by means of a switch 12, in order to secure the required phase relation and magnitude of the commutating-pole current for another operating speed of the motor. With such arrangement, the complete neutralization of the voltages opposing the commutation may be obtained for two conditions of operation, but the required changes in the connections are unsuitable for practical applications, in view of the only partial improvement over the conditions obtaining in the case of a simple impedance connected in parallel to the commutating pole winding.

According to my invention, I provide means for continually changing the magnitude and the phase relation of the current in the commutating-pole winding 6, in such manner as to produce the ideal commutating conditions throughout practically the entire range of motor speeds. An arrangement for securing such operation is shown in Fig. 3, illustrating a motor similar to that shown in Fig. 1, the only difference being in the shunt 21 which is connected in parallel to the commutating pole winding 6. The shunt 21, in my improved motor, embodies a resistor element 22 connected in series with a special reactor device 23, said reactor device producing a substantially constant reactive voltage drop independently of the magnitude of the current passing therethrough.

Such reactor may, for instance, be obtained by utilizing a choke coil having an iron-core which is saturated, or operates above the knee of the saturation curve, throughout substantially the entire range of the operating current, the reactive voltage drop in such case remaining substantially constant independently of the current passing therethrough.

The operation of my improved organization for securing the proper commutating-pole excitation may be better understood by considering the current relations in the different parts of the circuit, as illustrated in the vector diagram shown in Fig. 4. The commutating-pole currents $I_{c_1}$, $I_{c_2}$, etc., are shown in the same phase. In quadrature to the commutating-pole currents, are shown the vectors $E_{c_1}$, $E_{c_2}$, etc., representing the voltage across the terminals of the commutating-pole winding. The current in the shunt 21 causes a voltage drop which is composed of two components, one component $E_{r_1}$, $E_{r_2}$, etc., which is in phase with the current $I_{s_1}$, $I_{s_2}$, etc., corresponding to the resistance drop, and the other components $E_{x_1}$, $E_{x_2}$, etc., in quadrature to the current and corresponding to the reactance drop, the two voltage drops adding to produce the resultant $E_{c_1}$, $E_{c_2}$, etc. Since the reactance drop $E_{x_1}$, $E_{x_2}$, etc., always remains constant, the currents in the shunt 21 increase in phase and in magnitude with the increase of the commutating-pole current and produce a similar increase in the phase and the magnitude of the resultant armature currents $I_1$, $I_2$, etc., relative to the commutating-pole currents $I_{c_1}$, $I_{c_2}$, etc.

It is thus possible to secure, for each speed, the commutating-pole exciting current required to secure ideal commutating-pole conditions without the necessity of disturbing the circuit connections or using complicated switching mechanisms.

The special shunt connection utilized for controlling the current in the commutating-pole winding is not restricted to such uses only but may be employed in many other applications and I desire that the appended claims shall be construed to cover all such modifications as fall within the scope of my invention.

I claim as my invention:

1. In an alternating-current commutator series motor, a commutating-pole winding and means connected in parallel to said winding for producing a predetermined variation in the magnitude and phase of the current in said winding relatively to the motor current in response to the variation of said last-mentioned current.

2. The combination with an alternating-current motor comprising a serially connected field winding, an armature having a commutator winding and a commutating-pole winding, of a shunt connected in parallel to said commutating pole winding to control the current therethrough, said shunt comprising a resistor and means offering a substantially constant reactive voltage drop independently of the current flowing therethrough.

3. The combination with an alternating-current motor comprising a field winding, an armature having a commutator winding and a commutating-pole winding, said windings being connected in series, of impedance means connected in shunt to said commutating-pole winding, said impedance means embodying a resistor and a serially connected, iron-core choke coil, said choke coil operating above the knee of the saturation curve over substantially the entire operating range.

In testimony whereof, I have hereunto subscribed my name this 9th day of May, 1925.

KURT KRAUSS.